US009626815B2

(12) United States Patent
Li

(10) Patent No.: US 9,626,815 B2
(45) Date of Patent: Apr. 18, 2017

(54) METHOD FOR UNLOCKING ELECTRONIC DEVICE, AND APPARATUS THEREFOR

(71) Applicant: Huawei Technologies Co., Ltd., Shenzhen (CN)

(72) Inventor: Tongjun Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 207 days.

(21) Appl. No.: 14/491,002

(22) Filed: Sep. 19, 2014

(65) Prior Publication Data

US 2015/0084737 A1  Mar. 26, 2015

Related U.S. Application Data

(63) Continuation of application No. PCT/CN2014/075942, filed on Apr. 22, 2014.

(30) Foreign Application Priority Data

Sep. 22, 2013  (CN) .......................... 2013 1 0432756

(51) Int. Cl.
G07C 9/00 (2006.01)
G06F 3/0488 (2013.01)
(Continued)

(52) U.S. Cl.
CPC .......... *G07C 9/00126* (2013.01); *G06F 3/02* (2013.01); *G06F 3/0416* (2013.01);
(Continued)

(58) Field of Classification Search
CPC ............ G07C 9/00126; G07C 9/00134; G07C 2209/08; G06F 3/02; G06F 3/0416; G06F 3/0488; G06F 21/36
(Continued)

(56) References Cited

U.S. PATENT DOCUMENTS 6,509,847 B1 * 1/2003 Anderson ............. G06F 1/1616
178/18.01
2003/0063783 A1  4/2003 Higuchi
(Continued)

FOREIGN PATENT DOCUMENTS

CN 1392507 A 1/2003
CN 1813237 A 8/2006
(Continued)

OTHER PUBLICATIONS

Partial English Translation and Abstract of Japanese Patent Application No. JPA2005202527, Mar. 9, 2016, 56 pages.
(Continued)

*Primary Examiner* — Edwin Holloway, III
(74) *Attorney, Agent, or Firm* — Conley Rose, P.C.

(57) ABSTRACT

A method for unlocking an electronic device and an apparatus therefor are provided. The method includes the following steps: when an electronic device is in a function locked state, acquiring unlock trigger information generated by at least one operation in an operation area of the electronic device, where the unlock trigger information includes duration information of each operation of the at least one operation; and unlocking the function locked of the electronic device when the unlock trigger information matches preset unlock information. Concealment when a user unlocks function locked of an electronic device can be improved, so that security of data in the electronic device can be improved.

20 Claims, 5 Drawing Sheets

(51) Int. Cl.
  *G06F 3/02* (2006.01)
  *G06F 3/041* (2006.01)
  *G06F 21/36* (2013.01)

(52) U.S. Cl.
  CPC ............ *G06F 3/0488* (2013.01); *G06F 21/36* (2013.01); *G07C 9/00134* (2013.01); *G07C 2209/08* (2013.01)

(58) Field of Classification Search
  USPC .............................................. 340/5.51, 5.74
  See application file for complete search history.

(56) References Cited

U.S. PATENT DOCUMENTS

| | | | |
|---|---|---|---|
| 2007/0097084 A1 | 5/2007 | Niijima | |
| 2008/0117188 A1 | 5/2008 | Ko et al. | |
| 2009/0313693 A1 | 12/2009 | Rogers | |
| 2010/0099394 A1* | 4/2010 | Hainzl | G06F 1/32 455/418 |
| 2012/0013566 A1 | 1/2012 | Chung | |
| 2012/0126941 A1* | 5/2012 | Coggill | G06F 21/36 340/5.54 |
| 2012/0154329 A1 | 6/2012 | Shinozaki | |
| 2012/0204258 A1 | 8/2012 | Lee | |
| 2012/0272288 A1 | 10/2012 | Ashbrook et al. | |
| 2012/0274662 A1* | 11/2012 | Kim | G06F 3/0488 345/650 |
| 2013/0050250 A1 | 2/2013 | Brinda et al. | |
| 2013/0111415 A1 | 5/2013 | Newman et al. | |
| 2013/0141353 A1* | 6/2013 | Chang | G06F 3/0488 345/173 |
| 2013/0150128 A1 | 6/2013 | Tsunoda | |
| 2013/0157561 A1* | 6/2013 | Tamai | H04M 1/67 455/26.1 |
| 2013/0159927 A1* | 6/2013 | Chuang | G06F 3/0488 715/810 |
| 2013/0169542 A1 | 7/2013 | Lu et al. | |
| 2014/0189604 A1* | 7/2014 | Garrison | G06F 3/0488 715/863 |

FOREIGN PATENT DOCUMENTS

| | | |
|---|---|---|
| CN | 101192256 A | 6/2008 |
| CN | 101848279 A | 9/2010 |
| CN | 102314290 A | 1/2012 |
| CN | 102566818 A | 7/2012 |
| CN | 103092523 A | 5/2013 |
| CN | 103135822 A | 6/2013 |
| CN | 103488404 A | 1/2014 |
| EP | 2463798 A1 | 6/2012 |
| JP | 2005202527 A | 7/2005 |
| JP | 2005352927 A | 12/2005 |
| JP | 2006268073 A | 10/2006 |
| JP | 2009301523 A | 12/2009 |
| JP | 2012022664 A | 2/2012 |
| JP | 2012141869 A | 7/2012 |
| JP | 2013114317 A | 6/2013 |
| JP | 2013134729 A | 7/2013 |
| KR | 20130043292 A | 4/2013 |
| TW | M454753 U | 6/2013 |
| TW | 201331819 A | 8/2013 |
| TW | 201333784 A | 8/2013 |

OTHER PUBLICATIONS

Partial English Translation and Abstract of Japanese Patent Application No. JPA2006268073, Mar. 9, 2016, 24 pages.
Partial English Translation and Abstract of Japanese Patent Application No. JPA2009301523, Mar. 9, 2016, 11 pages.
Partial English Translation and Abstract of Japanese Patent Application No. JPA2012141869, Mar. 9, 2016, 64 pages.
Partial English Translation and Abstract of Japanese Patent Application No. JPA2013114317, Mar. 9, 2016, 35 pages.
Partial English Translation and Abstract of Japanese Patent Application No. JPA2013134729, Mar. 9, 2016, 52 pages.
Foreign Communication From a Counterpart Application, Korean Application No. 2015-537137, Korean Office Action dated Dec. 18, 2015, 4 pages.
Foreign Communication From a Counterpart Application, Korean Application No. 2015-537137, English Translation of Korean Office Action dated Dec. 18, 2015, 5 pages.
Partial English Translation and Abstract of Chinese Patent Application No. CN101192256, Dec. 9, 2015, 9 pages.
Partial English Translation and Abstract of Chinese Patent Application No. CN103135822, Dec. 9, 2015, 8 pages.
Foreign Communication From a Counterpart Application, Chinese Application No. 201310432756.9, Chinese Search Report dated Oct. 22, 2015, 2 pages.
Foreign Communication From a Counterpart Application, Chinese Application No. 201310432756.9, Chinese Office Action dated Nov. 2, 2015, 7 pages.
Partial English Translation and Abstract of Taiwanese Patent Application No. TWM454753, Jan. 21, 2016, 4 pages.
Foreign Communication From a Counterpart Application, Taiwanese Application No. 10421587250, Taiwanese Office Action dated Nov. 24, 2015, 8 pages.
Partial English Translation and Abstract of Chinese Patent Application No. CN101848279A, Dec. 12, 2014, 10 pages.
Partial English Translation and Abstract of Chinese Patent Application No. CN103488404A, Sep. 29, 2014, 3 pages.
Foreign Communication From a Counterpart Application, PCT Application No. PCT/CN2014/075942, International Search Report dated Jul. 30, 2014, 7 pages.
Foreign Communication From a Counterpart Application, PCT Application No. PCT/CN2014/075942, Written Opinion dated Jul. 30, 2014, 6 pages.
Foreign Communication From a Counterpart Application, European Application No. 14771494.3, Extended European Search Report dated May 26, 2015, 8 pages.
Foreign Communication From a Counterpart Application, Korean Application No. 2015-071806464, Korean Office Action dated Oct. 19, 2015, 7 pages.
Foreign Communication From a Counterpart Application, Korean Application No. 2015-071806464, English Translation of Korean Office Action dated Oct. 19, 2015, 5 pages.
Partial English Translation and Abstract of Japanese Patent Application No. JPA2005352927, Sep. 2, 2016, 58 pages.
Partial English Translation and Abstract of Japanese Patent Application No. JPA201222664, Sep. 2, 2016, 21 pages.
Foreign Communication From a Counterpart Application, Japanese Application No. 2015-537137, Japanese Office Action dated Jul. 26, 2016, 3 pages.
Foreign Communication From a Counterpart Application, Japanese Application No. 2015-537137, English Translation of Japanese Office Action dated Jul. 26, 2016, 4 pages.

* cited by examiner

METHOD FOR UNLOCKING ELECTRONIC DEVICE, AND APPARATUS THEREFOR

CROSS-REFERENCE TO RELATED APPLICATIONS

This application is a continuation of International Application No. PCT/CN2014/075942, filed on Apr. 22, 2014, which claims priority to Chinese Patent Application No. 201310432756.9, filed on Sep. 22, 2013, both of which are hereby incorporated by reference in their entireties.

TECHNICAL FIELD

The present invention relates to the field of electronic technologies, and in particular, to a method for unlocking an electronic device and an apparatus therefor.

BACKGROUND

With the continuous development and perfection of electronic technologies, electronic devices such as a mobile phone, a tablet computer, and the like have already become an indispensable part of people's lives. People not only communicate with each other by using these electronic devices, but also transfer files, make photographs, play games, and the like.

With the development of technologies, because an electronic device stores personal information and important data of a user, security performance of the electronic device also attracts attention. In the prior art, a restriction technology such as screen locking or application encryption, is used to reinforce security performance of information in the electronic device. For example, as for slide to unlock using a pattern on 9 grids, a motion track drawn by the user in a preset area of the electronic device is matched; if the motion track drawn by the user is consistent with a preset motion track stored in the electronic device, a screen of the electronic device is unlocked, and the user can normally use the electronic device.

Because when the user slides to unlock or enters a password, a drawn pattern, a slide gesture or an entered character is easily identified by another person, security performance of data in the electronic device cannot be better ensured, thereby reducing user experience.

SUMMARY

Embodiments of the present invention provide a method for unlocking an electronic device and an apparatus therefor, which can improve concealment when a user unlocks function locked of an electronic device, so that security of data in the electronic device is improved.

To solve the foregoing technical problem, according to a first aspect, an embodiment of the present invention provides a method for unlocking an electronic device, where the method may include, when an electronic device is in a function locked state, acquiring unlock trigger information generated by at least one operation in an operation area of the electronic device, where the unlock trigger information includes duration information of each operation of the at least one operation; and unlocking the function locked of the electronic device when the unlock trigger information matches preset unlock information.

According to the first aspect, in a first feasible implementation manner of the first aspect, coding processing is performed on the acquired unlock trigger information according to the duration information of each operation of the at least one operation, where the unlocking the function locked of the electronic device when the unlock trigger information matches preset unlock information includes, when the unlock trigger information on which the coding processing is performed matches the preset unlock information, unlocking the function locked of the electronic device.

According to the first feasible implementation manner of the first aspect, in a second feasible implementation manner of the first aspect, the performing coding processing on the acquired unlock trigger information according to the duration information of each operation of the at least one operation includes acquiring a duration level corresponding to the duration information of each operation of the at least one operation, and performing the coding processing on the unlock trigger information according to a duration level corresponding to duration of each operation of the at least one operation, where the duration level corresponding to the duration information of each operation is duration range information that covers the duration information of each operation.

According to the first aspect, in a third feasible implementation manner of the first aspect, the unlock trigger information further includes information of pressure produced by each operation of the at least one operation onto the operation area of the electronic device.

According to the third feasible implementation manner of the first aspect, in a fourth feasible implementation manner of the first aspect, the method further includes performing coding processing on the acquired unlock trigger information according to the duration information and the pressure information of each operation of the at least one operation, where the unlocking the function locked of the electronic device when the unlock trigger information matches preset unlock information includes, when the unlock trigger information on which the coding processing is performed matches the preset unlock information, unlocking the function locked of the electronic device.

According to the fourth feasible implementation manner of the first aspect, in a fifth feasible implementation manner of the first aspect, the performing coding processing on the acquired unlock trigger information according to the duration information and the pressure information of each operation of the at least one operation includes acquiring a trigger level corresponding to duration information and pressure information of a same operation of the at least one operation, and performing the coding processing on the unlock trigger information according to the trigger level corresponding to the duration information and the pressure information of the same operation of the at least one operation, where the trigger level corresponding to the duration information and the pressure information of the same operation is information of a value range that a combination of duration and pressure which covers the duration information and the pressure information of each operation falls into.

According to the first aspect or the first feasible implementation manner of the first aspect or the second feasible implementation manner of the first aspect or the third feasible implementation manner of the first aspect or the fourth feasible implementation manner of the first aspect or the fifth feasible implementation manner of the first aspect, in a sixth feasible implementation manner of the first aspect, after the acquiring unlock trigger information generated by at least one operation in an operation area of the electronic device, the method further includes displaying the acquired unlock trigger information.

According to the first aspect or the first feasible implementation manner of the first aspect or the second feasible implementation manner of the first aspect or the third feasible implementation manner of the first aspect or the fourth feasible implementation manner of the first aspect or the fifth feasible implementation manner of the first aspect or the sixth feasible implementation manner of the first aspect, in a seventh feasible implementation manner of the first aspect, the operation area of the electronic device includes a touch screen of the electronic device and/or a physical button of the electronic device.

According to a second aspect, an embodiment of the present invention provides an apparatus for unlocking an electronic device, where the apparatus may include an information monitoring module configured to, when an electronic device is in a function locked state, monitor unlock trigger information generated by at least one operation in an operation area of the electronic device, where time information carried by the unlock trigger information includes a time sequence formed by duration of each operation of the at least one operation; a code generating module configured to perform coding processing on the monitored unlock trigger information to generate a sensing signal; and an unlocking module configured to unlock the function locked of the electronic device when the sensing signal matches a preset unlock signal.

According to the second aspect, in a first feasible implementation manner of the second aspect, the apparatus further includes a first coding module configured to perform coding processing on the acquired unlock trigger information according to the duration information of each operation of the at least one operation, where the unlocking module is specifically configured to, when the unlock trigger information on which the coding processing is performed by the first coding module matches preset unlock information, unlock the function locked of the electronic device.

According to the first feasible implementation manner of the second aspect, in a second feasible implementation manner of the second aspect, the first coding module is specifically configured to acquire a duration level corresponding to the duration information of each operation of the at least one operation, and perform the coding processing on the unlock trigger information according to a duration level corresponding to duration of each operation of the at least one operation, where the duration level corresponding to the duration information of each operation is duration range information that covers the duration information of each operation.

According to the second aspect, in a third feasible implementation manner of the second aspect, the unlock trigger information further includes information of pressure produced by each operation of the at least one operation onto the operation area of the electronic device.

According to the third feasible implementation manner of the second aspect, in a fourth feasible implementation manner of the second aspect, the apparatus further includes a second coding module configured to perform coding processing on the acquired unlock trigger information according to the duration information and the pressure information of each operation of the at least one operation, where the unlocking module is specifically configured to, when the unlock trigger information on which the coding processing is performed by the second coding module matches the preset unlock information, unlock the function locked of the electronic device.

According to the fourth feasible implementation manner of the second aspect, in a fifth feasible implementation manner of the second aspect, the second coding module is specifically configured to acquire a trigger level corresponding to duration information and pressure information of a same operation of the at least one operation, and perform the coding processing on the unlock trigger information according to the trigger level corresponding to the duration information and the pressure information of the same operation of the at least one operation, where the trigger level corresponding to the duration information and the pressure information of the same operation is information of a value range that a combination of duration and pressure which covers the duration information and the pressure information of each operation falls into.

According to the second aspect or the first feasible implementation manner of the second aspect or the second feasible implementation manner of the second aspect or the third feasible implementation manner of the second aspect or the fourth feasible implementation manner of the second aspect or the fifth feasible implementation manner of the second aspect, in a sixth feasible implementation manner of the second aspect, the apparatus further includes a displaying module configured to display the acquired unlock trigger information.

According to the second aspect or the first feasible implementation manner of the second aspect or the second feasible implementation manner of the second aspect or the third feasible implementation manner of the second aspect or the fourth feasible implementation manner of the second aspect or the fifth feasible implementation manner of the second aspect or the sixth feasible implementation manner of the second aspect, in a seventh feasible implementation manner of the second aspect, the operation area of the electronic device includes a touch screen of the electronic device and/or a physical button of the electronic device.

It can be known from the above that, when an electronic device is in a function locked state, unlock trigger information may be matched according to duration information of each operation in the acquired unlock trigger information; and the function locked of the electronic device is unlocked when the unlock trigger information matches preset unlock information. In addition, because operation duration information tends to be concealed and is more imperceptible compared with a slide gesture or direct character entering, by using the operation duration information as an unlock condition, concealment can be improved when a user unlocks the function locked of the electronic device, so that security of data in the electronic device is improved, thereby improving user experience.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, when an electronic device is in a function locked state, unlock trigger information generated by at least one operation in an operation area of the electronic device is acquired; and the function locked of the electronic device is unlocked when the unlock trigger information matches preset unlock information.

The electronic device may be an electronic device with a touch screen and/or a physical button, for example, a mobile phone, a computer, a tablet computer, a password insurance apparatus, or the like, where the password insurance apparatus is an apparatus disposed on a password insurance box and used to control a switch of the password insurance box; the apparatus for unlocking an electronic device may be an independent device or be integrated with the electronic device, and is configured to unlock the function locked of the electronic device.

A method for unlocking an electronic device provided by the embodiments of the present invention may be applied to a scenario in which a screen of the electronic device is unlocked, for example, a scenario in which a screen of a mobile phone is unlocked, a computer interface is locked, or the like, and may also be applied to a scenario in which application software is derestricted, for example, a scenario in which the application software is logged in to by using an account. The method for unlocking an electronic device may also be applied to a scenario in which unlock is performed when private data or a personal item is viewed or taken, for example, a scenario in which when information, contact or the like in a mobile phone is viewed, the mobile phone needs to be unlocked, or when a personal item is taken from the password insurance box, the switch of the password insurance box needs to be turned off.

Figure 1:
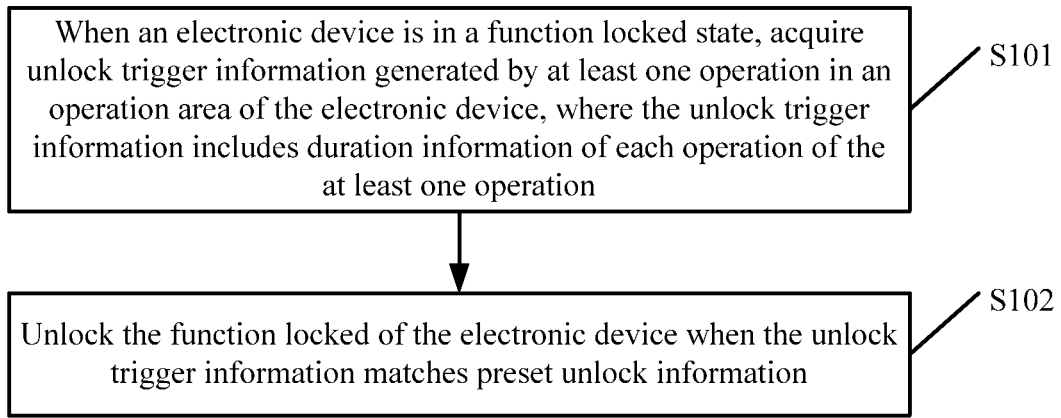
FIG. 1 is a schematic flowchart of a method for unlocking an electronic device according to an embodiment of the present invention.
Figure 2:
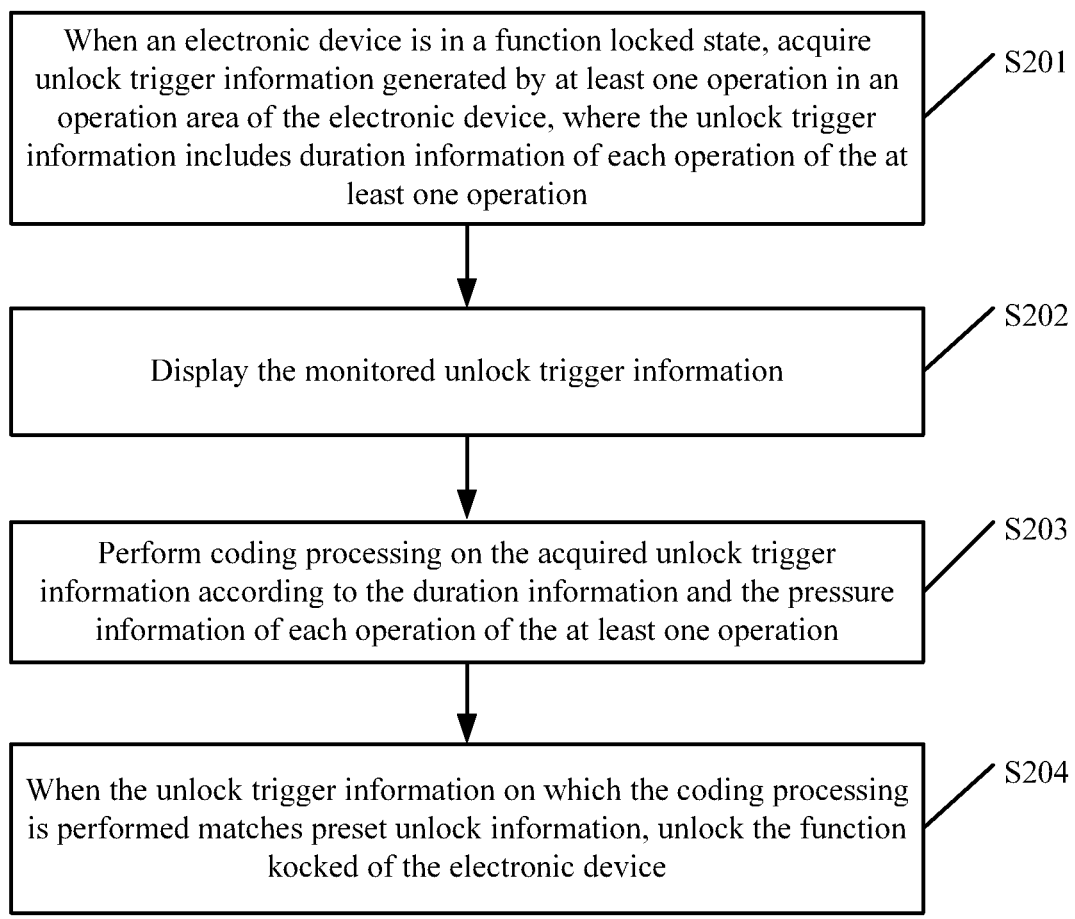
FIG. 2 is a schematic flowchart of another method for unlocking an electronic device according to an embodiment of the present invention.
Figure 3:
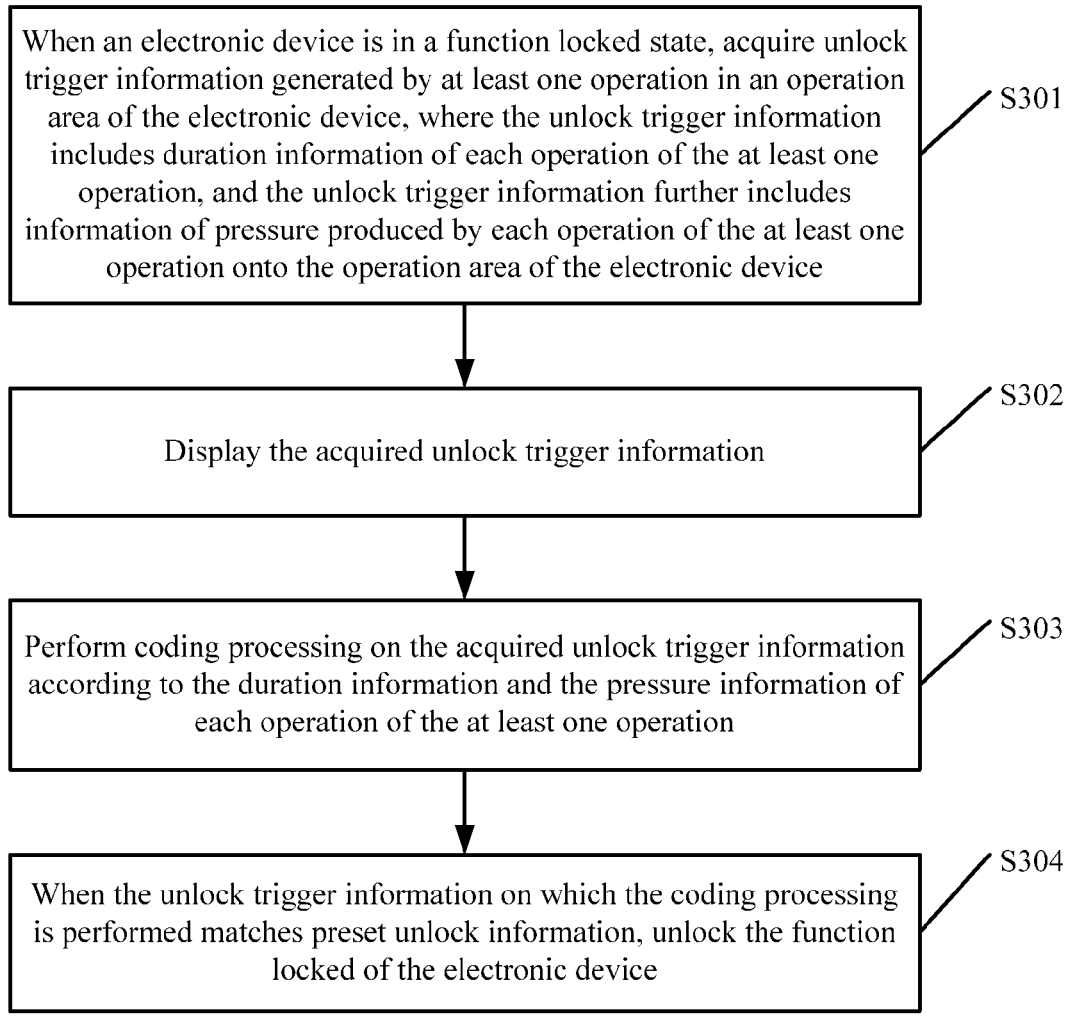
FIG. 3 is a schematic flowchart of still another method for unlocking an electronic device according to an embodiment of the present invention.

With reference to FIG. 1 to FIG. 3, a method for unlocking an electronic device provided by an embodiment of the present invention is described in detail in the following. It should be noted that the method according to the embodiments shown in FIG. 1 to FIG. 3 may be applied to the apparatus for unlocking an electronic device.

Refer to FIG. 1, which is a schematic flowchart of a method for unlocking an electronic device according to an embodiment of the present invention. As shown in FIG. 1, the method may include the following steps S101 to S102.

S101. When an electronic device is in a function locked state, acquire unlock trigger information generated by at least one operation in an operation area of the electronic device, where the unlock trigger information includes duration information of each operation of the at least one operation.

Specifically, the electronic device being in the function locked state includes the electronic device is in a screen locked state or an application in the electronic device is in a to-be-verified state, or the like, and the apparatus for unlocking an electronic device acquires unlock trigger information generated by at least one operation performed by a user in the operation area of the electronic device, where the unlock trigger information includes duration information of each operation of the at least one operation. In addition to the duration information of the operation, the unlock trigger information may further include other feature information of the operation, for example, double-click, click, operation strength, a slide length of a slide operation, or the like.

Preferably, to more effectively ensure security of the electronic device, the acquired unlock trigger information includes duration information of each operation of two or more operations.

It should be noted that the operation area of the electronic device may include a touch screen of the electronic device and/or a physical button of the electronic device, and the operation performed by the user may be a touch operation performed on the touch screen by the user and/or a click operation performed on the physical button by the user.

S102. Unlock the function locked of the electronic device when the unlock trigger information matches preset unlock information.

Specifically, the apparatus for unlocking an electronic device may match the duration information of each operation of the at least one operation with the preset unlock information; and when the duration information of each operation of the at least one operation matches and is consistent with the preset unlock information, the apparatus for unlocking an electronic device unlocks the function locked of the electronic device.

For example, if the preset unlock information is that a first operation (for example, a click operation) lasts for 5 seconds (s) and a second operation lasts for 3 s, and the same case is applied to the unlock trigger information, the function locked of the electronic device is unlocked.

It should be noted that the user may set or reset an unlock signal when the user begins to use the electronic device or in a process of using the electronic device, and the preset unlock information is used to provide information matching for the apparatus for unlocking an electronic device to unlock the function locked of the electronic device. When the electronic device enters a setting state, the apparatus for unlocking an electronic device may acquire the duration information of the at least one operation performed by the user in the operation area of the electronic device to generate the preset unlock information. Preferably, when the user performs an operation, a scale may be displayed in a screen of the electronic device to prompt the duration information of each operation of the at least one operation performed by the user.

Certainly, the foregoing manner of generating the preset unlock signal is only an example, and the preset unlock signal may also be configured in advance in the electronic device by a manufacturer or an operator.

In the embodiment of the present invention, when the electronic device is in the setting state, if an operation manner used by the user is a touch operation performed on the touch screen, accordingly, when the electronic device is in the function locked state, the user needs to perform an unlock operation in a manner of performing a touch operation on the touch screen, an operable area is any position of the touch screen, that is, the user performs a touch operation at any position in the touch screen, and the apparatus for unlocking an electronic device may acquire the unlock trigger information. Similarly, when the electronic device is in the setting state, if the operation manner used by the user is a click operation performed on the physical button, accordingly, when the electronic device is in the function locked state, the user needs to perform an unlock operation in a manner of performing a click operation on the physical button, an operable area is any button of the physical button, that is, the user performs a click operation on any button of the physical button, and the apparatus for unlocking an electronic device may acquire the unlock trigger information. Because a position or a button is not limited in the operation area, when the user unlocks the function locked of the electronic device, concealment of an operation performed by the user can be better improved.

Certainly, in the embodiment of the present invention, a mixed operation manner may also be used. That is, when the electronic device is in the setting state, the user may use a mixed operation that includes a touch operation on the touch screen and a click operation on the physical button, accordingly, when the electronic device is in the function locked state, the user may also perform an unlock operation by using a mixed operation that includes a touch operation on the touch screen and a click operation on the physical button, an operable area is any position of the touch screen and any button of the physical button, that is, the user performs a touch operation at any position in the touch screen and a click operation on any button of the physical button, and the apparatus for unlocking an electronic device may acquire the unlock trigger information.

In the embodiment of the present invention, when an electronic device is in a function locked state, unlock trigger information may be matched according to duration information of each operation in the acquired unlock trigger information; and the function locked of the electronic device is unlocked when the unlock trigger information matches preset unlock information. In addition, because operation duration information and pressure information tend to be concealed and are more imperceptible compared with a slide gesture or direct character entering, in the embodiment of the present invention, by using the operation duration information, or the operation duration information and the pressure information as an unlock condition, concealment can be improved when a user unlocks the function locked of the electronic device, so that security of data in the electronic device is improved, thereby improving user experience.

Refer to FIG. 2, which is a schematic flowchart of another method for unlocking an electronic device according to an embodiment of the present invention. The embodiment of the present invention is a specific implementation manner of the embodiment shown in FIG. 1. As shown in FIG. 2, the method according to the embodiment of the present invention includes the following steps S201 to S204.

S201. When an electronic device is in a function locked state, acquire unlock trigger information generated by at least one operation in an operation area of the electronic device, where the unlock trigger information includes duration information of each operation of the at least one operation.

Specifically, the electronic device being in the function locked state includes the electronic device is in a screen locked state or an application in the electronic device is in a to-be-verified state, or the like, and the apparatus for unlocking an electronic device acquires unlock trigger information generated by at least one operation performed by a user in the operation area of the electronic device, where the unlock trigger information includes duration information of each operation of the at least one operation. In addition to the duration information of the operation, the unlock trigger information may further include other feature information of the operation, for example, double-click, click, operation strength, a slide length of a slide operation, or the like.

Preferably, to more effectively ensure security of the electronic device, the acquired unlock trigger information includes duration information of each operation of two or more operations, and the apparatus for unlocking an electronic device may arrange the duration information of each operation according to a time sequence to generate a duration information sequence.

It should be noted that the operation area of the electronic device may include a touch screen of the electronic device and/or a physical button of the electronic device, and the operation performed by the user may be a touch operation performed on the touch screen by the user and/or a click operation performed on the physical button by the user.

S202. Display the acquired unlock trigger information.

Specifically, when the user performs an operation, the apparatus for unlocking an electronic device may display the acquired unlock trigger information. Preferably, the apparatus for unlocking an electronic device may control display of a scale in a screen of the electronic device, so as to prompt the duration information of each operation of the at least one operation performed by the user.

S203. Perform coding processing on the acquired unlock trigger information according to the duration information of each operation of the at least one operation.

Specifically, the apparatus for unlocking an electronic device may perform the coding processing on the acquired unlock trigger information according to the duration information of each operation of the at least one operation.

Preferably, the apparatus for unlocking an electronic device acquires a duration level corresponding to the duration information of each operation of the at least one operation, and performs the coding processing on the unlock trigger information according to a duration level corresponding to duration of each operation of the at least one operation, where the duration level corresponding to the duration information of each operation is duration range information that covers the duration information of each operation.

For example, level 1 of the duration level is defined as operation duration of (0,1] second, level 2 of the duration level is defined as operation duration of (1, 2] seconds, level 3 of the duration level is defined as operation duration of (2, 3] seconds, level 4 of the duration level is defined as operation duration of (3, 4] seconds, and the like. When the user performs an operation according to the scale displayed in the screen of the electronic device, if duration of the performed operation is within 0 to 1 second, a duration level corresponding to the operation is level 1; if duration of the performed operation is within 1 to 2 seconds, a duration level corresponding to the operation is level 2, and the rest may be deduced by analogy. The apparatus for unlocking an electronic device may perform coding in a duration level manner and according to duration of an operation performed each time by the user, and perform coding processing on the foregoing duration information sequence into a duration level sequence.

It should be noted that by defining a duration level, operation duration of the user may be subject to a specific error range, which reduces a precision requirement for the operation duration. In addition, in a case in which the precision requirement for the operation duration is not high, the electronic device may not display or prompt the operation duration to the user. In this way, concealment of the unlock operation is higher, and security of data in the electronic device is better.

S204. When the unlock trigger information on which the coding processing is performed matches preset unlock information, unlock the function locked of the electronic device.

Specifically, the apparatus for unlocking an electronic device may match the unlock trigger information on which the coding processing is performed with the preset unlock information; and when the unlock trigger information on which the coding processing is performed matches and is consistent with the preset unlock information, the apparatus for unlocking an electronic device unlocks the function locked of the electronic device.

For example, if the preset unlock information is that a first operation (for example, a click operation) lasts for 5 s and a second operation lasts for 3 s, and the same case is applied to the unlock trigger information, the preset unlock information and the unlock trigger information are coded according to the same manner, and structures of the preset unlock information and the coded unlock trigger information are also the same. In this case, the function locked of the electronic device is unlocked.

It should be noted that the user may set or reset an unlock signal when the user begins to use the electronic device or in a process of using the electronic device, and the preset unlock information is used to provide information matching for the apparatus for unlocking an electronic device to unlock the function locked of the electronic device. When the electronic device enters a setting state, the apparatus for unlocking an electronic device may acquire the duration information of the at least one operation performed by the user in the operation area of the electronic device to generate the preset unlock information. Preferably, when the user performs an operation, a scale may be displayed in a screen of the electronic device to prompt the duration information of each operation of the at least one operation performed by the user.

Certainly, the foregoing manner of generating the preset unlock signal is only an example, and the preset unlock signal may also be configured in advance in the electronic device by a manufacturer or an operator.

In the embodiment of the present invention, when the electronic device is in the setting state, if an operation manner used by the user is a touch operation performed on the touch screen, accordingly, when the electronic device is in the function locked state, the user needs to perform an unlock operation in a manner of performing a touch operation on the touch screen, an operable area is any position of the touch screen, that is, the user performs a touch operation at any position in the touch screen, and the apparatus for unlocking an electronic device may acquire the unlock trigger information. Similarly, when the electronic device is in the setting state, if the operation manner used by the user is a click operation performed on the physical button, accordingly, when the electronic device is in the function locked state, the user needs to perform an unlock operation in a manner of performing a click operation on the physical button, an operable area is any button of the physical button, that is, the user performs a click operation on any button of the physical button, and the apparatus for unlocking an electronic device may acquire the unlock trigger information. Because a position or a button is not limited in the operation area, when the user unlocks the function locked of the electronic device, concealment of an operation performed by the user can be better improved.

Certainly, in the embodiment of the present invention, a mixed operation manner may also be used. That is, when the electronic device is in the setting state, the user may use a mixed operation that includes a touch operation on the touch screen and a click operation on the physical button, accordingly, when the electronic device is in the function locked state, the user may also perform an unlock operation by using a mixed operation that includes a touch operation on the touch screen and a click operation on the physical button, an operable area is any position of the touch screen and any button of the physical button, that is, the user performs a touch operation at any position in the touch screen and a click operation on any button of the physical button, and the apparatus for unlocking an electronic device may acquire the unlock trigger information.

In the embodiment of the present invention, when an electronic device is in a function locked state, coding processing may be performed on unlock trigger information according to duration information of each operation in the acquired unlock trigger information; and when the unlock trigger information on which the coding processing is performed matches preset unlock information, the function locked of the electronic device is unlocked. In addition, because operation duration information tends to be concealed and is more imperceptible compared with a slide gesture or direct character entering, in the embodiment of the present invention, by using the operation duration information as an unlock condition, concealment can be improved when a user unlocks the function locked of the electronic device, so that security of data in the electronic device is improved, thereby improving user experience.

Refer to FIG. 3, which is a schematic flowchart of still another method for unlocking an electronic device according to an embodiment of the present invention. The embodiment of the present invention is an extension manner of the embodiment shown in FIG. 1. As shown in FIG. 3, the method according to the embodiment of the present invention includes the following steps S301 to S304.

S301. When an electronic device is in a function locked state, acquire unlock trigger information generated by at least one operation in an operation area of the electronic device, where the unlock trigger information includes duration information of each operation of the at least one operation, and the unlock trigger information further includes information of pressure produced by each operation of the at least one operation onto the operation area of the electronic device.

Specifically, the electronic device being in the function locked state includes the electronic device is in a screen locked state or an application in the electronic device is in a to-be-verified state, or the like, and the apparatus for unlocking an electronic device acquires unlock trigger information generated by at least one operation performed by a user in the operation area of the electronic device, where the unlock trigger information includes duration information of each operation of the at least one operation and further includes information of pressure produced by each operation of the at least one operation onto the operation area of the electronic device. In addition to the duration information and the pressure information of the operation, the unlock trigger information may further include other feature information of the operation, for example, double-click, click, operation strength, a slide length of a slide operation, or the like.

Preferably, to more effectively ensure security of the electronic device, the acquired unlock trigger information includes duration information and pressure information of each operation of two or more operations, and the apparatus for unlocking an electronic device may arrange a combination of the duration information and the pressure information of each operation according to a time sequence to generate a trigger information sequence.

It should be noted that the electronic device may include a pressure sensor, where the pressure sensor may be disposed below a panel of the operation area of the electronic device and is configured to sense pressure information of an operation performed by the user. The operation area of the electronic device may include a touch screen of the electronic device and/or a physical button of the electronic device, and the operation performed by the user may be a touch operation performed on the touch screen by the user and/or a click operation performed on the physical button by the user.

S302. Display the acquired unlock trigger information.

Specifically, when the user performs an operation, the apparatus for unlocking an electronic device may display the acquired unlock trigger information. Preferably, the apparatus for unlocking an electronic device may control display of a scale in a screen of the electronic device, so as to prompt the duration information and the pressure information of each operation of the at least one operation performed by the user.

S303. Perform coding processing on the acquired unlock trigger information according to the duration information and the pressure information of each operation of the at least one operation.

Specifically, the apparatus for unlocking an electronic device may perform the coding processing on the acquired unlock trigger information according to the duration information and the pressure information of each operation of the at least one operation.

Preferably, the apparatus for unlocking an electronic device acquires a trigger level corresponding to duration information and pressure information of a same operation of the at least one operation, and performs the coding processing on the unlock trigger information according to the trigger level corresponding to the duration information and the pressure information of the same operation of the at least one operation, where the trigger level corresponding to the duration information and the pressure information of the same operation is information of a value range that a combination of duration and pressure which covers the duration information and the pressure information of each operation falls into. The combination of the duration and the pressure may be implemented in a combination manner such as a product of duration and pressure of each operation, a sum of the duration and the pressure of each operation, or the like.

Using the product of the duration and the pressure of each operation as an example, level 1 of the trigger level is defined as that the product of the duration and the pressure is 1, level 2 of the trigger level is defined as that the product of the duration and the pressure is 2, level 3 of the trigger level is defined as that the product of the duration and the pressure is 3, level 4 of the trigger level is defined as that the product of the duration and the pressure is 4, and the like. When the user performs an operation according to the scale displayed in the screen of the electronic device, if duration of the performed operation is 1× time unit and a pressure size of the performed operation is 1× pressure, a trigger level corresponding to the operation is level 1; if the duration of the performed operation is 1× time unit and the pressure size of the performed operation is 2× pressure, a trigger level corresponding to the operation is level 2; if the duration of the performed operation is 2× time unit and the pressure size of the performed operation is 1× pressure, a trigger level corresponding to the operation is also level 2. The rest may be deduced by analogy. The apparatus for unlocking an electronic device may perform coding by using a trigger level manner and according to duration and pressure of an operation performed each time by the user, and perform coding processing on the foregoing trigger information into a trigger level sequence.

It should be noted that by defining a trigger level, operation duration and a pressure size of the user may be subject to a specific error range, which reduces a precision requirement for the operation duration and the pressure size. In addition, in a case in which the precision requirement for the operation duration and the pressure size is not high, the electronic device may not display or prompt the operation duration and the pressure size to the user. In this way, concealment of the unlock operation is higher, and security of data in the electronic device is better.

S304. When the unlock trigger information on which the coding processing is performed matches preset unlock information, unlock the function locked of the electronic device.

Specifically, the apparatus for unlocking an electronic device may match the unlock trigger information on which the coding processing is performed with the preset unlock information; and when the unlock trigger information on which the coding processing is performed matches and is consistent with the preset unlock information, the apparatus for unlocking an electronic device unlocks the function locked of the electronic device.

For example, if the preset unlock information is that a first operation (for example, a click operation) lasts for 2 s, operation pressure of the first operation is 2× pressure, a second operation lasts for 3 s, and operation pressure of the second operation is 1× pressure, and the same case is applied to the unlock trigger information, the preset unlock information and the unlock trigger information are coded according to the same manner, and structures of the preset unlock information and the coded unlock trigger information are also the same. In this case, the function locked of the electronic device is unlocked.

It should be noted that the user may set or reset an unlock signal when the user begins to use the electronic device or in a process of using the electronic device, and the preset unlock information is used to provide information matching for the apparatus for unlocking an electronic device to unlock the function locked of the electronic device. When the electronic device enters a setting state, the apparatus for unlocking an electronic device may acquire the duration information and the pressure information of the at least one operation performed by the user in the operation area of the electronic device to generate the preset unlock information. Preferably, when the user performs an operation, a scale may be displayed in a screen of the electronic device to prompt the duration information and the pressure information of each operation of the at least one operation performed by the user.

Certainly, the foregoing manner of generating the preset unlock signal is only an example, and the preset unlock signal may also be configured in advance in the electronic device by a manufacturer or an operator.

In the embodiment of the present invention, when the electronic device is in the setting state, if an operation manner used by the user is a touch operation performed on the touch screen, accordingly, when the electronic device is in the function locked state, the user needs to perform an unlock operation in a manner of performing a touch operation on the touch screen, an operable area is any position of the touch screen, that is, the user performs a touch operation at any position in the touch screen, and the apparatus for unlocking an electronic device may acquire the unlock trigger information. Similarly, when the electronic device is in the setting state, if the operation manner used by the user is a click operation performed on the physical button, accordingly, when the electronic device is in the function locked state, the user needs to perform an unlock operation in a manner of performing a click operation on the physical button, an operable area is any button of the physical button, that is, the user performs a click operation on any button of the physical button, and the apparatus for unlocking an electronic device may acquire the unlock trigger information. Because a position or a button is not limited in the operation area, when the user unlocks the function locked of the electronic device, concealment of an operation performed by the user can be better improved.

Certainly, in the embodiment of the present invention, a mixed operation manner may also be used. That is, when the electronic device is in the setting state, the user may use a mixed operation that includes a touch operation on the touch screen and a click operation on the physical button, accordingly, when the electronic device is in the function locked state, the user may also perform an unlock operation by using a mixed operation that includes a touch operation on the touch screen and a click operation on the physical button, an operable area is any position of the touch screen and any button of the physical button, that is, the user performs a touch operation at any position in the touch screen and a click operation on any button of the physical button, and the apparatus for unlocking an electronic device may acquire the unlock trigger information.

In the embodiment of the present invention, when an electronic device is in a function locked state, coding processing may be performed on unlock trigger information according to duration information and pressure information of each operation in the acquired unlock trigger information; and when the unlock trigger information on which the coding processing is performed matches preset unlock information, the function locked of the electronic device is unlocked. In a manner of combining duration and a pressure size, a means of unlocking the function locked of the electronic device by a user may be added. In addition, because operation duration information and the pressure information tend to be concealed and are more imperceptible compared with a slide gesture or direct character entering, in the embodiment of the present invention, by using the operation duration information and the pressure information as an unlock condition, concealment can be improved when the user unlocks the function locked of the electronic device, so that security of data in the electronic device is improved, thereby improving user experience.

Figure 4:
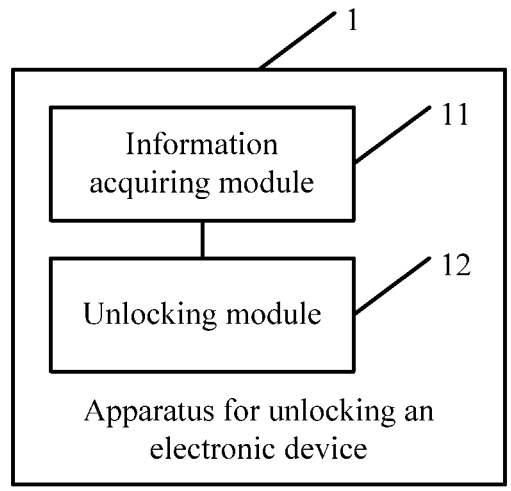
FIG. 4 is a schematic structural diagram of an apparatus for unlocking an electronic device according to an embodiment of the present invention.
Figure 5:
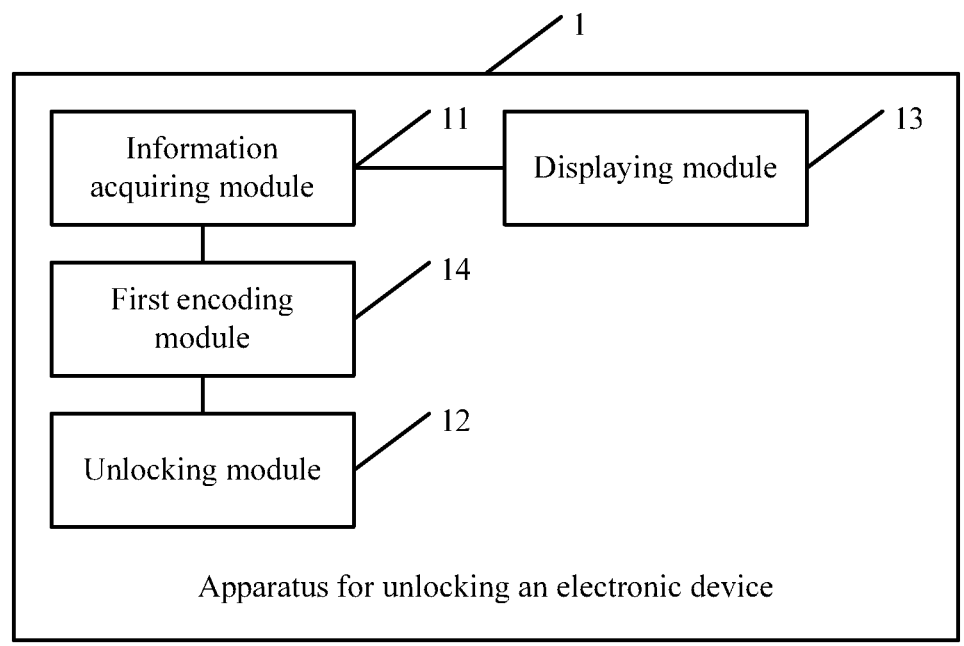
FIG. 5 is a schematic structural diagram of another apparatus for unlocking an electronic device according to an embodiment of the present invention.
Figure 6:
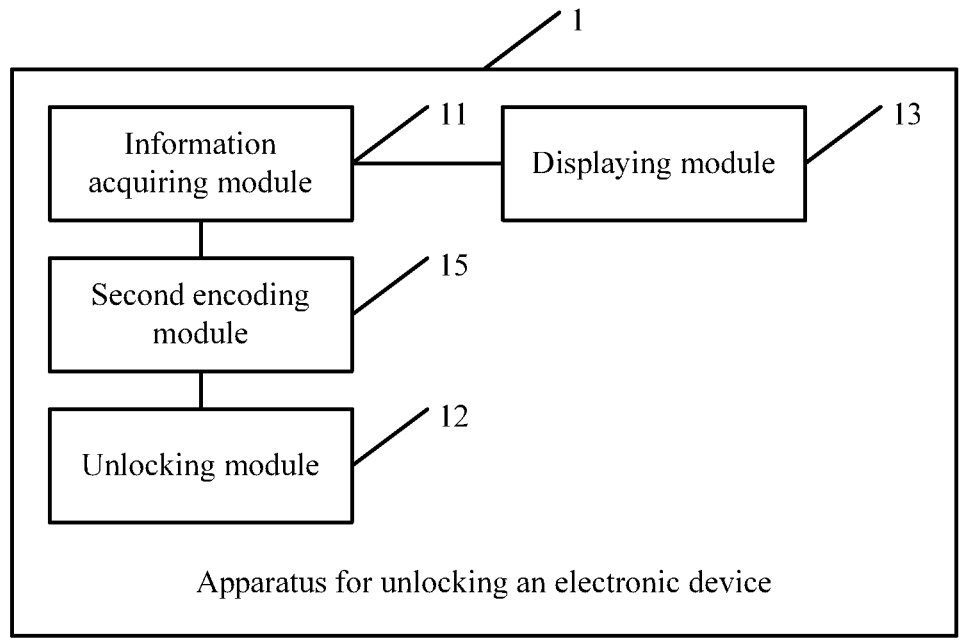
FIG. 6 is a schematic structural diagram of still another apparatus for unlocking an electronic device according to an embodiment of the present invention.

With reference to FIG. 4 to FIG. 6, the apparatus for unlocking an electronic device provided by an embodiment of the present invention is described in detail in the following. It should be noted that the apparatus for unlocking an electronic device shown in FIG. 4 to FIG. 6 is configured to perform the methods according to the embodiments shown in FIG. 1 to FIG. 3 in the present invention. For the convenience of description, only parts related to the embodiment of the present invention are shown. For undisclosed specific technical details, reference may be made to the embodiments shown in FIG. 1 to FIG. 3 in the present invention.

Refer to FIG. 4, which is a schematic structural diagram of an apparatus for unlocking an electronic device according to an embodiment of the present invention. As shown in FIG. 4, the apparatus 1 for unlocking an electronic device according to the embodiment of the present invention may include an information acquiring module 11 and an unlocking module 12.

The information acquiring module 11 is configured to, when an electronic device is in a function locked state, acquire unlock trigger information generated by at least one operation in an operation area of the electronic device, where the unlock trigger information includes duration information of each operation of the at least one operation.

During specific implementation, the electronic device being in the function locked state includes: the electronic device is in a screen locked state or an application in the electronic device is in a to-be-verified state, or the like, and the information acquiring module 11 acquires unlock trigger information generated by at least one operation performed by a user in the operation area of the electronic device, where the unlock trigger information includes duration information of each operation of the at least one operation. In addition to the duration information of the operation, the unlock trigger information may further include other feature information of the operation, for example, double-click, click, operation strength, a slide length of a slide operation, or the like.

Preferably, to more effectively ensure security of the electronic device, the unlock trigger information acquired by the information acquiring module 11 includes duration information of each operation of two or more operations.

It should be noted that the operation area of the electronic device may include a touch screen of the electronic device and/or a physical button of the electronic device, and the operation performed by the user may be a touch operation performed on the touch screen by the user and/or a click operation performed on the physical button by the user.

The unlocking module 12 is configured to unlock the function locked of the electronic device when the unlock trigger information matches preset unlock information.

During specific implementation, the unlocking module 12 may match the duration information of each operation of the at least one operation with the preset unlock information; and when the duration information of each operation of the at least one operation matches and is consistent with the preset unlock information, the unlocking module 12 unlocks the function locked of the electronic device.

For example, if the preset unlock information is that a first operation (for example, a click operation) lasts for 5 s and a second operation lasts for 3 s, and the same case is applied to the unlock trigger information, the unlocking module 12 unlocks the function locked of the electronic device.

It should be noted that the user may set or reset an unlock signal when the user begins to use the electronic device or in a process of using the electronic device, and the preset unlock information is used to provide information matching for the apparatus for unlocking an electronic device to unlock the function locked of the electronic device. When the electronic device enters a setting state, the apparatus 1 for unlocking an electronic device may acquire the duration information of the at least one operation performed by the user in the operation area of the electronic device to generate the preset unlock information. Preferably, when the user performs an operation, a scale may be displayed in a screen of the electronic device to prompt the duration information of each operation of the at least one operation performed by the user.

Certainly, the foregoing manner of generating the preset unlock signal is only an example, and the preset unlock signal may also be configured in advance in the electronic device by a manufacturer or an operator.

In the embodiment of the present invention, when the electronic device is in the setting state, if an operation manner used by the user is a touch operation performed on the touch screen, accordingly, when the electronic device is in the function locked state, the user needs to perform an unlock operation in a manner of performing a touch operation on the touch screen, an operable area is any position of the touch screen, that is, the user performs a touch operation at any position in the touch screen, and the information acquiring module 11 may acquire the unlock trigger information. Similarly, when the electronic device is in the setting state, if the operation manner used by the user is a click operation performed on the physical button, accordingly, when the electronic device is in the function locked state, the user needs to perform an unlock operation in a manner of performing a click operation on the physical button, an operable area is any button of the physical button, that is, the user performs a click operation on any button of the physical button, the information acquiring module 11 may acquire the unlock trigger information. Because a position or a button is not limited in the operation area, when the user unlocks the function locked of the electronic device, concealment of an operation performed by the user can be better improved.

Certainly, in the embodiment of the present invention, a mixed operation manner may also be used. That is, when the electronic device is in the setting state, the user may use a mixed operation that includes a touch operation on the touch screen and a click operation on the physical button; accordingly, when the electronic device is in the function locked state, the user may also perform an unlock operation by using a mixed operation that includes a touch operation on the touch screen and a click operation on the physical button, an operable area is any position of the touch screen and any button of the physical button, that is, the user performs a touch operation at any position in the touch screen and a click operation on any button of the physical button, and the information acquiring module 11 may acquire the unlock trigger information.

In the embodiment of the present invention, when an electronic device is in a function locked state, unlock trigger information may be matched according to duration information of each operation in the acquired unlock trigger information; and the function locked of the electronic device is unlocked when the unlock trigger information matches preset unlock information. In addition, because operation duration information tends to be concealed and is more imperceptible compared with a slide gesture or direct character entering, in the embodiment of the present invention, by using the operation duration information as an unlock condition, concealment can be improved when a user unlocks the function locked of the electronic device, so that security of data in the electronic device is improved, thereby improving user experience.

Refer to FIG. 5, which is a schematic structural diagram of another apparatus for unlocking an electronic device according to an embodiment of the present invention. As shown in FIG. 5, the apparatus 1 for unlocking an electronic device according to the embodiment of the present invention may include an information acquiring module 11, an unlocking module 12, a displaying module 13, and a first coding module 14.

The information acquiring module 11 is configured to: when an electronic device is in a function locked state, acquire unlock trigger information generated by at least one operation in an operation area of the electronic device, where the unlock trigger information includes duration information of each operation of the at least one operation.

During specific implementation, the electronic device being in the function locked state includes the electronic device is in a screen locked state or an application in the electronic device is in a to-be-verified state, or the like, and the information acquiring module 11 acquires unlock trigger information generated by at least one operation performed by a user in the operation area of the electronic device, where the unlock trigger information includes duration information of each operation of the at least one operation. In addition to the duration information of the operation, the unlock trigger information may further include other feature information of the operation, for example, double-click, click, operation strength, a slide length of a slide operation, or the like.

Preferably, to more effectively ensure security of the electronic device, the unlock trigger information acquired by the information acquiring module 11 includes duration information of each operation of two or more operations, and the information acquiring module 11 may arrange the duration information of each operation according to a time sequence to generate a duration information sequence.

It should be noted that the operation area of the electronic device may include a touch screen of the electronic device and/or a physical button of the electronic device, and the operation performed by the user may be a touch operation performed on the touch screen by the user and/or a click operation performed on the physical button by the user.

The displaying module 13 is configured to display the acquired unlock trigger information.

During specific implementation, when the user performs an operation, the displaying module 13 may display the acquired unlock trigger information. Preferably, the displaying module 13 may control display of a scale in a screen of the electronic device, so as to prompt the duration information of each operation of the at least one operation performed by the user.

The first coding module 14 is configured to perform coding processing on the acquired unlock trigger information according to the duration information of each operation of the at least one operation.

During specific implementation, the first coding module 14 may perform the coding processing on the acquired unlock trigger information according to the duration information of each operation of the at least one operation.

Preferably, the first coding module 14 acquires a duration level corresponding to the duration information of each operation of the at least one operation, and performs the coding processing on the unlock trigger information according to a duration level corresponding to duration of each operation of the at least one operation, where the duration level corresponding to the duration information of each operation is duration range information that covers the duration information of each operation.

For example, level 1 of the duration level is defined as operation duration of (0,1] second, level 2 of the duration level is defined as operation duration of (1, 2] seconds, level 3 of the duration level is defined as operation duration of (2, 3] seconds, level 4 of the duration level is defined as operation duration of (3, 4] seconds, and the like. When the user performs an operation according to the scale displayed in the screen of the electronic device, if duration of the performed operation is within 0 to 1 second, a duration level corresponding to the operation is level 1; if duration of the performed operation is within 1 to 2 seconds, a duration level corresponding to the operation is level 2, and the rest may be deduced by analogy. The first coding module 14 may perform coding in a duration level manner and according to duration of an operation performed each time by the user, and perform coding processing on the foregoing duration information sequence into a duration level sequence.

It should be noted that by defining a duration level, operation duration of the user may be subject to a specific error range, which reduces a precision requirement for the operation duration. In addition, in a case in which the precision requirement for the operation duration is not high, the electronic device may not display or prompt the operation duration to the user. In this way, concealment of the unlock operation is higher, and security of data in the electronic device is better.

The unlocking module 12 is configured to unlock the function locked of the electronic device when the unlock trigger information matches preset unlock information.

During specific implementation, the unlocking module 12 is specifically configured to: when the unlock trigger information on which the coding processing is performed by the first coding module 14 matches the preset unlock information, unlock the function locked of the electronic device.

The apparatus 1 for unlocking an electronic device may match the unlock trigger information on which the coding processing is performed with the preset unlock information; and when the unlock trigger information on which the coding processing is performed matches and is consistent with the preset unlock information, the unlocking module 12 unlocks the function locked of the electronic device.

For example, if the preset unlock information is that a first operation (for example, a click operation) lasts for 5 s and the second operation lasts for 3 s, and the same case is applied to the unlock trigger information, the preset unlock information and the unlock trigger information are coded according to the same manner, and structures of the preset unlock information and the coded unlock trigger information are also the same. In this case, the unlocking module 12 unlocks the function locked of the electronic device.

It should be noted that the user may set or reset an unlock signal when the user begins to use the electronic device or in a process of using the electronic device, and the preset unlock information is used to provide information matching for the apparatus for unlocking an electronic device to unlock the function locked of the electronic device. When the electronic device enters a setting state, the apparatus 1 for unlocking an electronic device may acquire the duration information of the at least one operation performed by the user in the operation area of the electronic device to generate the preset unlock information. Preferably, when the user performs an operation, a scale may be displayed in a screen of the electronic device to prompt the duration information of each operation of the at least one operation performed by the user.

Certainly, the foregoing manner of generating the preset unlock signal is only an example, and the preset unlock signal may also be configured in advance in the electronic device by a manufacturer or an operator.

In the embodiment of the present invention, when the electronic device is in the setting state, if an operation manner used by the user is a touch operation performed on the touch screen, accordingly, when the electronic device is in the function locked state, the user needs to perform an unlock operation in a manner of performing a touch operation on the touch screen, an operable area is any position of the touch screen, that is, the user performs a touch operation at any position in the touch screen, and the information acquiring module 11 may acquire the unlock trigger information. Similarly, when the electronic device is in the setting state, if the operation manner used by the user is a click operation on the physical button, accordingly, when the electronic device is in the function locked state, the user needs to perform an unlock operation in a manner of performing a click operation on the physical button, an operable area is any button of the physical button, that is, the user performs a click operation on any button of the physical button, and the information acquiring module 11 may acquire the unlock trigger information. Because a position or a button is not limited in the operation area, when the user unlocks the function locked of the electronic device, concealment of an operation performed by the user can be better improved.

Certainly, in the embodiment of the present invention, a mixed operation manner may also be used. That is, when the electronic device is in the setting state, the user may use a mixed operation that includes a touch operation on the touch screen and a click operation on the physical button, accordingly, when the electronic device is in the function locked state, the user may also perform an unlock operation by using a mixed operation that includes a touch operation on the touch screen and a click operation on the physical button, an operable area is any position of the touch screen and any button of the physical button, that is, the user performs a touch operation at any position in the touch screen and a click operation on any button of the physical button, and the information acquiring module 11 may acquire the unlock trigger information.

In the embodiment of the present invention, when an electronic device is in a function locked state, coding processing may be performed on unlock trigger information according to duration information of each operation in the acquired unlock trigger information; and when the unlock trigger information on which the coding processing is performed matches preset unlock information, the function locked of the electronic device is unlocked. In addition, because operation duration information tends to be concealed and is more imperceptible compared with a slide gesture or direct character entering, in the embodiment of the present invention, by using the operation duration information as an unlock condition, concealment can be improved when a user unlocks the function locked of the electronic device, so that security of data in the electronic device is improved, thereby improving user experience.

Refer to FIG. 6, which is a schematic structural diagram of still another apparatus for unlocking an electronic device according to an embodiment of the present invention. As shown in FIG. 6, the apparatus 1 for unlocking an electronic device according to the embodiment of the present invention may include an information acquiring module 11, an unlocking module 12, a displaying module 13, and a second coding module 15.

The information acquiring module 11 is configured to, when an electronic device is in a function locked state, acquire unlock trigger information generated by at least one operation in an operation area of the electronic device, where the unlock trigger information includes duration information of each operation of the at least one operation.

During specific implementation, the electronic device being in the function locked state includes the electronic device is in a screen locked state or an application in the electronic device is in a to-be-verified state, or the like, and the information acquiring module 11 acquires unlock trigger information generated by at least one operation performed by a user in the operation area of the electronic device, where the unlock trigger information includes duration information of each operation of the at least one operation and further includes information of pressure produced by each operation of the at least one operation onto the operation area of the electronic device. In addition to the duration information and the pressure information of the operation, the unlock trigger information may further include other feature information of the operation, for example, double-click, click, operation strength, a slide length of a slide operation, or the like.

Preferably, to more effectively ensure security of the electronic device, the unlock trigger information acquired by the information acquiring module 11 includes duration information and pressure information of each operation of two or more operations, and the information acquiring module 11 may arrange a combination of the duration information and the pressure information of each operation according to a time sequence to generate a trigger information sequence.

It should be noted that the electronic device may include a pressure sensor, where the pressure sensor may be disposed below a panel of the operation area of the electronic device and is configured to sense pressure information of an operation performed by the user. The operation area of the electronic device may include a touch screen of the electronic device and/or a physical button of the electronic device, and the operation performed by the user may be a touch operation performed on the touch screen by the user and/or a click operation performed on the physical button by the user.

The displaying module 13 is configured to display the acquired unlock trigger information.

During specific implementation, when the user performs an operation, the displaying module 13 may display the acquired unlock trigger information. Preferably, the displaying module 13 may control display of a scale in a screen of the electronic device, so as to prompt the duration information and the pressure information of each operation of the at least one operation performed by the user.

The second coding module 15 is configured to perform coding processing on the acquired unlock trigger information according to the duration information and the pressure information of each operation of the at least one operation.

During specific implementation, the second coding module 15 may perform the coding processing on the acquired unlock trigger information according to the duration information and the pressure information of each operation of the at least one operation.

Preferably, the second coding module 15 acquires a trigger level corresponding to duration information and pressure information of a same operation of the at least one operation, and performs the coding processing on the unlock trigger information according to the trigger level corresponding to the duration information and the pressure information of the same operation of the at least one operation, where the trigger level corresponding to the duration information and the pressure information of the same operation is information of a value range that a combination of duration and pressure which covers the duration information and the pressure information of each operation falls into. The combination of the duration and the pressure may be implemented in a combination manner such as a product of duration and pressure of each operation, a sum of the duration and the pressure of each operation, or the like.

Using the product of the duration and the pressure of each operation as an example, level 1 of the trigger level is defined as that the product of the duration and the pressure is 1, level 2 of the trigger level is defined as that the product of the duration and the pressure is 2, level 3 of the trigger level is defined as that the product of the duration and the pressure is 3, level 4 of the trigger level is defined as that the product of the duration and the pressure is 4, and the like. When the user performs an operation according to the scale displayed in the screen of the electronic device, if duration of the performed operation is 1× time unit and a pressure size of the performed operation is 1× pressure, a trigger level corresponding to the operation is level 1; if the duration of the performed operation is 1× time unit and the pressure size of the performed operation is 2× pressure, a trigger level corresponding to the operation is level 2; if the duration of the performed operation is 2× time unit and the pressure size of the performed operation is 1× pressure, a trigger level corresponding to the operation is also level 2. The rest may be deduced in the same manner. The second coding module 15 may perform coding by using a trigger level manner and according to duration and pressure of an operation performed each time by the user, and perform coding processing on the foregoing trigger information sequence into a trigger level sequence.

It should be noted that by defining a trigger level, operation duration and a pressure size of the user may be subject to a specific error range, which reduces a precision requirement for the operation duration and the pressure size. In addition, in a case in which the precision requirement for the operation duration and the pressure size is not high, the electronic device may not display or prompt the operation duration and the pressure size to the user. In this way, concealment of the unlock operation is higher, and security of data in the electronic device is better.

The unlocking module 12 is configured to unlock the function locked of the electronic device when the unlock trigger information matches preset unlock information.

During specific implementation, the unlocking module 12 is specifically configured to, when the unlock trigger information on which the coding processing is performed by the second coding module 15 matches the preset unlock information, unlock the function locked of the electronic device.

The apparatus 1 for unlocking an electronic device may match the unlock trigger information on which the coding processing is performed with the preset unlock information; and when the unlock trigger information on which the coding processing is performed matches and is consistent with the preset unlock information, the unlocking module 12 unlocks the function locked of the electronic device.

For example, if the preset unlock information is that a first operation (for example, a click operation) lasts for 2 seconds (s), operation pressure of the first operation is 2× pressure, a second operation lasts for 3 s, and operation pressure of the second operation is 1× pressure, and the same case is applied to the unlock trigger information, the preset unlock information and the unlock trigger information are coded according to the same manner, and structures of the preset unlock information and the coded unlock trigger information are also the same. In this case, the unlocking module 12 unlocks the function locked of the electronic device.

It should be noted that the user may set or reset an unlock signal when the user begins to use the electronic device or in a process of using the electronic device, and the preset unlock information is used to provide information matching for the apparatus for unlocking an electronic device to unlock the function locked of the electronic device. When the electronic device enters a setting state, the apparatus 1 for unlocking an electronic device may acquire the duration information and the pressure information of the at least one operation performed by the user in the operation area of the electronic device to generate the preset unlock information. Preferably, when the user performs an operation, a scale may be displayed in a screen of the electronic device to prompt the duration information and the pressure information of each operation of the at least one operation performed by the user.

Certainly, the foregoing manner of generating the preset unlock signal is only an example, and the preset unlock signal may also be configured in advance in the electronic device by a manufacturer or an operator.

In the embodiment of the present invention, when the electronic device is in the setting state, if an operation manner used by the user is a touch operation performed on the touch screen, accordingly, when the electronic device is in the function locked state, the user needs to perform an unlock operation in a manner of performing a touch operation on the touch screen, an operable area is any position of the touch screen, that is, the user performs a touch operation at any position in the touch screen, and the information acquiring module 11 may acquire the unlock trigger information. Similarly, when the electronic device is in the setting state, if the operation manner used by the user is a click operation on the physical button, accordingly, when the electronic device is in the function locked state, the user needs to perform an unlock operation in a manner of performing a click operation on the physical button, an operable area is any button of the physical button, that is, the user performs a click operation on any button of the physical button, and the information acquiring module 11 may acquire the unlock trigger information. Because a position or a button is not limited in the operation area, when the user unlocks the function locked of the electronic device, concealment of an operation performed by the user can be better improved.

Certainly, in the embodiment of the present invention, a mixed operation manner may also be used. That is, when the electronic device is in the setting state, the user may use a mixed operation that includes a touch operation on the touch screen and a click operation on the physical button, accordingly, when the electronic device is in the function locked state, the user may also perform an unlock operation by using a mixed operation that includes a touch operation on the touch screen and a click operation on the physical button, an operable area is any position of the touch screen and any button of the physical button, that is, the user performs a touch operation at any position in the touch screen and a click operation on any button of the physical button, and the information acquiring module 11 may acquire the unlock trigger information.

In the embodiment of the present invention, when an electronic device is in a function locked state, coding processing may be performed on unlock trigger information according to duration information and pressure information of each operation in the acquired unlock trigger information; and when the unlock trigger information on which the coding processing is performed matches preset unlock information, the function locked of the electronic device is unlocked. In a manner of combining duration and a pressure size, a means of unlocking the function locked of the electronic device by a user may be added. In addition, because operation duration information and the pressure information tend to be concealed and are more imperceptible compared with a slide gesture or direct character entering, in the embodiment of the present invention, by using the operation duration information and the pressure information as an unlock condition, concealment can be improved when the user unlocks the function locked of the electronic device, so that security of data in the electronic device is improved, thereby improving user experience.

It should be noted that the first coding module 14 of the embodiment shown in FIG. 5 and the second coding module 15 of the embodiment shown in FIG. 6 may be concurrently integrated into the apparatus 1 for unlocking an electronic device, and the apparatus 1 for unlocking an electronic device may determine, according to an unlock manner used by the user, to perform the coding processing on the unlock trigger information by using the first coding module 14 or the second coding module 15.

Figure 7:
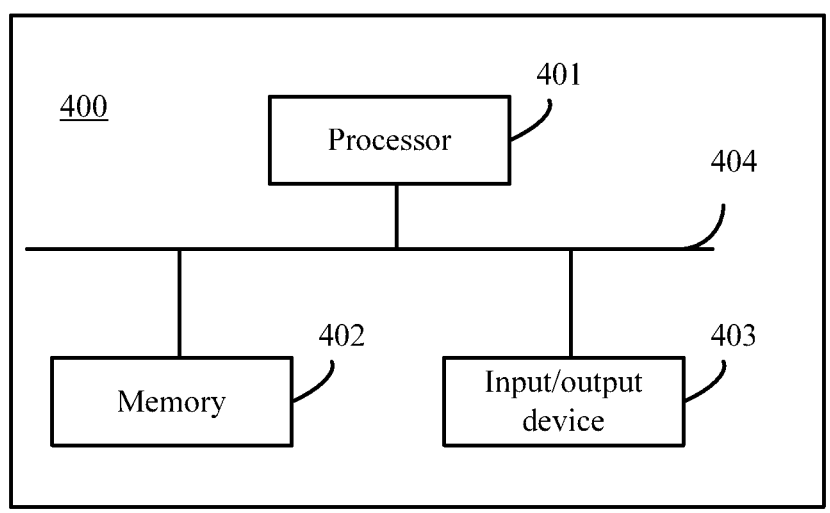
FIG. 7 is a schematic structural diagram of an apparatus for unlocking an electronic device based on a computer system according to an embodiment of the present invention.

The apparatus for unlocking an electronic device provided by the embodiment of the present invention may be implemented based on a computer system, and the methods shown in FIG. 1 to FIG. 3 may be implemented in the apparatus for unlocking an electronic device based on the computer system. FIG. 7 shows an embodiment of an apparatus for unlocking an electronic device based on a computer system. The apparatus 400 for unlocking an electronic device provided by this embodiment may include a processor 401, a memory 402, and an input/output device 403.

The memory 402 is configured to store program code. The processor 401 is configured to execute the program code stored in the memory 402. In the embodiment of the present invention, the memory 402 stores first program code, and the processor 401 is configured to execute the first program code, and perform the following operations: when an electronic device is in a function locked state, acquiring unlock trigger information generated by at least one operation in an operation area of the electronic device, where the unlock trigger information includes duration information of each operation of the at least one operation; and unlocking the function locked of the electronic device when the unlock trigger information matches preset unlock information.

The input/output device 403 may be two independent devices, for example, a physical button and a display screen or a touch screen and a display screen, or the like. The input/output device 403 may also be one device, for example, a display screen with a touch function, or the like. The apparatus 400 for unlocking an electronic device receives the unlock trigger information by using the input/output device 403 (shown in FIG. 1 to FIG. 3 illustrating the method embodiments). The processor processes, according to the program code in the memory 402, the unlock trigger information received by the input/output device 403.

During specific implementation, in a first feasible implementation manner of the embodiment of the present invention, the processor 401 further performs the following steps: performing coding processing on the acquired unlock trigger information according to the duration information of each operation of the at least one operation; and when the unlock trigger information on which the coding processing is performed matches the preset unlock information, unlocking the function locked of the electronic device.

Specifically, the processor 401 acquires a duration level corresponding to the duration information of each operation of the at least one operation, and performs the coding processing on the unlock trigger information according to a duration level corresponding to duration of each operation of the at least one operation, where the duration level corresponding to the duration information of each operation is duration range information that covers the duration information of each operation.

In a second feasible implementation manner of the embodiment of the present invention, the unlock trigger information further includes information of pressure produced by each operation of the at least one operation onto the operation area of the electronic device. The processor 401 performs coding processing on the acquired unlock trigger information according to the duration information and the pressure information of each operation of the at least one operation; and when the unlock trigger information on which the coding processing is performed matches the preset unlock information, the processor 401 unlocks the function locked of the electronic device.

Specifically, the processor 401 acquires a trigger level corresponding to duration information and pressure information of a same operation of the at least one operation, and performs the coding processing on the unlock trigger information according to the trigger level corresponding to the duration information and the pressure information of the same operation of the at least one operation, where the trigger level corresponding to the duration information and the pressure information of the same operation is information of a value range that a combination of duration and pressure which covers the duration information and the pressure information of each operation falls into.

The processor 401 may further display the acquired unlock trigger information. Specifically, the processor 401 displays the unlock trigger information on the input/output device 403, for example, the processor instructs a display to display the unlock trigger information (the duration information and/or the pressure information).

It should be noted that the processor 401 may be a central processing unit (CPU), an application-specific integrated circuit (ASIC) or the like. A management gateway device in this embodiment may include a bus 404. The processor 401, the memory 402, and the input/output device 403 may be connected to and communicate with each other through the bus 404. The memory 402 may include an entity having a storage function, for example, a random access memory (RAM), a read-only memory (ROM), a magnetic disk or the like. The preset unlock information in the embodiment of the present invention may be temporarily stored in the RAM.

It can be seen that, in the embodiment of the present invention, when an electronic device is in a function locked state, unlock trigger information may be matched according to duration information of each operation or duration information and pressure information of each operation in the acquired unlock trigger information; and the function locked of the electronic device is unlocked when the unlock trigger information matches preset unlock information. In addition, because operation duration information tends to be concealed and is more imperceptible compared with a slide gesture or direct character entering, by using the operation duration information as an unlock condition, concealment can be improved when a user unlocks the function locked of the electronic device, so that security of data in the electronic device is improved, thereby improving user experience.

According to descriptions of the foregoing implementation manners, a person skilled in the art can clearly understand that the present invention may be implemented by hardware, firmware, or a combination of the two. When the present invention is implemented by software, the functions may be stored in a computer-readable medium or may be transmitted as one or more instructions or code on the computer-readable medium. The computer-readable medium includes a computer storage medium and a communications medium, where the communications medium includes any medium that facilitates transfer of computer programs from one place to another place. The storage medium may be any available medium that is accessible by a computer. Examples of the computer-readable medium include but are not limited to a RAM, a ROM, or other optical disk storage media or disk storage media or other magnetic storage devices, or any other computer-accessible media that can be used to carry or store expected program codes in an instruction form or in a data structure form. Moreover, any connection may be the computer readable medium properly. For example, if software is transmitted from a website, a server or another remote source by using a coaxial cable, an optical cable, a twisted pair, or a digital subscriber line, or by using a radio technology such as infrared transmission, radio transmission, or microwave transmission, the coaxial cable, the optical cable, the twisted pair, or the digital subscriber line, or the radio technology such as infrared transmission, radio transmission, or microwave transmission, is included in a fixation of the medium. A disk and a disc used in the present invention include a compact disc, a laser disc, an optical disc, a digital versatile disc, a floppy disk, and a BLUE RAY disc, where the disk generally copies data magnetically, and the disc copies data optically by using laser. Combinations of them shall also fall within the protection scope of the computer-readable medium.

The foregoing disclosed descriptions are merely exemplary embodiments of the present invention, and certainly, are not intended to limit the protection scope of the present invention. Therefore, equivalent variations made according to the claims of the present invention shall fall within the scope of the present invention.

What is claimed is:
1. A method for unlocking an electronic device, comprising:
displaying a scale on a screen of the electronic device to prompt duration information and pressure information of each operation of at least one operation in an operation area of the electronic device;
acquiring unlock trigger information generated by the at least one operation in the operation area of the electronic device when the electronic device is in a function locked state, wherein the unlock trigger information comprises the duration information and the pressure information of each operation of the at least one operation;
calculating a mathematical combination of the duration information and the pressure information of each operation of the at least one operation, wherein the mathematical combination comprises multiplying the duration information and the pressure information to produce a product;
acquiring a preset trigger level corresponding to the duration information and the pressure information of the at least one operation; and
unlocking the function locked state of the electronic device when the mathematical combination of the duration information and the pressure information of each operation of the at least one operation matches the preset trigger level.

2. The method according to claim 1, further comprising performing coding processing on the acquired unlock trigger information according to the duration information of each operation of the at least one operation, and wherein unlocking the function locked state of the electronic device when the unlock trigger information matches preset unlock information comprises unlocking the function locked state of the electronic device when the unlock trigger information on which the coding processing is performed matches the preset unlock information.

3. The method according to claim 2, wherein performing coding processing on the acquired unlock trigger information according to the duration information of each operation of the at least one operation comprises:
acquiring a duration level corresponding to the duration information of each operation of the at least one operation; and
performing the coding processing on the unlock trigger information according to a duration level corresponding to duration of each operation of the at least one operation,
wherein the duration level corresponding to the duration information of each operation is duration range information that covers the duration information of each operation.

4. The method according to claim 1, wherein the pressure information is produced by each operation of the at least one operation onto the operation area of the electronic device.

5. The method according to claim 4, further comprising performing coding processing on the acquired unlock trigger information according to the duration information and the pressure information of each operation of the at least one operation, and wherein unlocking the function locked state of the electronic device when the unlock trigger information matches the preset unlock information comprises unlocking the function locked state of the electronic device when the unlock trigger information on which the coding processing is performed matches the preset unlock information.

6. The method according to claim 5, wherein performing coding processing on the acquired unlock trigger information according to the duration information and the pressure information of each operation of the at least one operation comprises performing the coding processing on the unlock trigger information according to the preset trigger level corresponding to the duration information and the pressure information of the at least one operation, wherein the preset trigger level corresponding to the duration information and the pressure information of the same operation is information of a value range.

7. The method according to claim 1, wherein after acquiring the unlock trigger information generated by the at least one operation in the operation area of the electronic device, the method further comprises displaying the acquired unlock trigger information.

8. The method according to claim 1, wherein the operation area of the electronic device comprises a touch screen of the electronic device and a physical button of the electronic device.

9. An apparatus for unlocking an electronic device, comprising:
a non-volatile computer readable medium configured to store instructions thereon; and
a computer processor coupled to the non-volatile computer readable medium and configured to execute the instructions to:
display a scale on a screen of the electronic device to prompt duration information and pressure information of each operation of at least one operation in an operation area of the electronic device;
acquire unlock trigger information generated by the at least one operation in the operation area of the electronic device when the electronic device is in a function locked state, wherein the unlock trigger information comprises the duration information and the pressure information of each operation of the at least one operation;
calculate a mathematical combination of the duration information and the pressure information of each operation of the at least one operation, wherein the mathematical combination comprises multiplying the duration information and the pressure information to produce a product;
acquire a preset trigger level corresponding to the duration information and the pressure information of the at least one operation; and
unlock the function locked state of the electronic device when the mathematical combination of the duration information and the pressure information of each operation of the at least one operation matches the preset trigger level.

10. The apparatus according to claim 9, wherein the computer processor is configured to execute the instructions to:
perform coding processing on the acquired unlock trigger information according to the duration information of each operation of the at least one operation; and
unlock the function locked state of the electronic device when the unlock trigger information on which the coding processing is performed by the first coding module matches the preset unlock information.

11. The apparatus according to claim 10, wherein the computer processor is configured to execute the instructions to:
acquire a duration level corresponding to the duration information of each operation of the at least one operation; and
perform the coding processing on the unlock trigger information according to a duration level corresponding to duration of each operation of the at least one operation,
wherein the duration level corresponding to the duration information of each operation is duration range information that covers the duration information of each operation.

12. The apparatus according to claim 9, further comprising a pressure sensor coupled to the computer processor, and wherein the unlock trigger information further comprises the pressure information produced by each operation of the at least one operation onto the operation area of the electronic device.

13. The apparatus according to claim 12, wherein the computer processor is configured to execute the instructions to perform coding processing on the acquired unlock trigger information according to the duration information and the pressure information of each operation of the at least one operation, wherein the unlocking module is specifically configured to unlock the function locked state of the electronic device when the unlock trigger information on which the coding processing is performed by the second coding module matches the preset unlock information.

14. The apparatus according to claim 13, wherein the computer processor is configured to execute the instructions to perform the coding processing on the unlock trigger information according to the preset trigger level corresponding to the duration information and the pressure information of the at least one operation, wherein the preset trigger level corresponding to the duration information and the pressure information is information of a value range.

15. The apparatus according to claim 9, wherein the computer processor is further configured to execute the instructions to display the acquired unlock trigger information on the screen.

16. The apparatus according to claim 9, wherein the operation area of the electronic device comprises a touch screen of the electronic device and a physical button of the electronic device.

17. A computer system, comprising:
a processor, and
a memory coupled to the processor,
wherein the processor is configured to:
   display a scale on a screen of an electronic device to prompt duration information and pressure information of each operation of at least one operation in an operation area of the electronic device;
   read a program stored in the memory to acquire unlock trigger information generated by the at least one operation in the operation area of the electronic device when the electronic device is in a function locked state, wherein the unlock trigger information comprises the duration information and the pressure information of each operation of the at least one operation;
   calculate a mathematical combination of the duration information and the pressure information of each operation of the at least one operation, wherein the mathematical combination comprises multiplying the duration information and the pressure information to produce a product;
   acquire a preset trigger level corresponding to the duration information and the pressure information of the at least one operation; and
   unlock the function locked state of the electronic device when the mathematical combination of the duration information and the pressure information of each operation of the at least one operation matches the preset trigger level.

18. The system according to claim 17, further comprising a pressure sensor coupled to the processor, wherein the unlock trigger information further comprises the pressure information produced by each operation of the at least one operation onto the operation area of the electronic device.

19. The system according to claim 18, wherein the processor is further configured to:
   perform coding processing on the acquired unlock trigger information according to the duration information and the pressure information of each operation of the at least one operation; and
   unlock the function locked state of the electronic device when the unlock trigger information on which the coding processing is performed matches the preset unlock information.

20. The system according to claim 19, wherein the processor is further configured to perform the coding processing on the unlock trigger information according to the trigger level corresponding to the duration information and the pressure information of the at least one operation, wherein the trigger level corresponding to the duration information and the pressure information is information of a value range.

* * * * *